March 15, 1966 E. WERNER 3,240,343
COMBINED SEPTIC TANK AND LEACHING POOL
Filed Jan. 30, 1963 2 Sheets-Sheet 1

INVENTOR.
EDWIN WERNER
BY
ATTORNEY

March 15, 1966     E. WERNER     3,240,343
COMBINED SEPTIC TANK AND LEACHING POOL
Filed Jan. 30, 1963     2 Sheets-Sheet 2
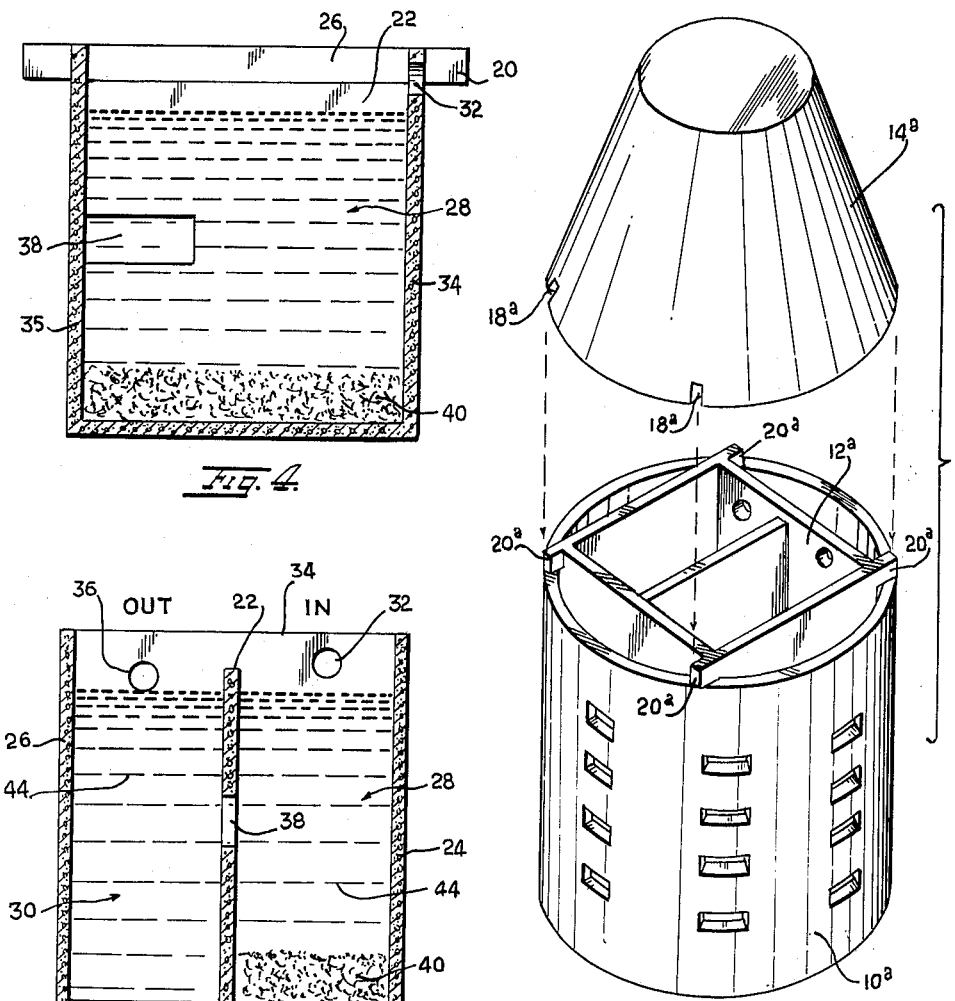
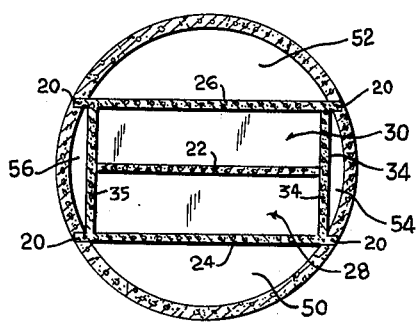
INVENTOR.
EDWIN WERNER
BY
ATTORNEY United States Patent Office 3,240,343
Patented Mar. 15, 1966

3,240,343
COMBINED SEPTIC TANK AND LEACHING POOL
Edwin Werner, Lake Grove, N.Y., assignor to The Septa-Leach Corporation, Holtsville, N.Y.
Filed Jan. 30, 1963, Ser. No. 254,945
2 Claims. (Cl. 210—256)

This invention relates to a combined septic tank and leaching pool, and more particularly to a single combined unit which performs the functions of both tank and pool.

It frequently is essential, particularly in areas where the soil has a relatively low absorption rate, to provide a plurality of tanks in series, the first being a septic tank into which a combination of sludge and liquid is discharged. The function of the septic tank is to collect the sludge and solid wastes and through bacterial or other action to operate upon or decompose the sludge. A discharge or egress passage, relatively near the top of the septic tank, conducts overflow liquids from said tank to a second tank, sometimes called a leaching pool. The latter facility, as its name implies, conventionally takes the form of a perforated vessel through which liquid wastes are disseminated into the ambient soil.

In view of the relatively low soil absorption rates, as occurs, for example, in areas having a substantial percentage of subsurface clay, the area of the leaching tank is correspondingly required to be of considerable magnitude to permit appropriate drainage without back-up of the liquid wastes.

Thus, the disadvantages of arrangements predicated on the concept of separate tanks and a separate function for each tank are manifest. Physically, two separate and expensive excavations of the soil are required for the two tanks. The two distinct tanks are costly per se, and as indicated above the necessity for a large surface area (and volume) in the leaching tank dictates a rather sizable unit. Moreover, the dimensions of the septic tank itself have to be considerable to insure adequate storage capacity for solid sludge and to reduce the intervals required for cleaning or removal of accumulated sludge.

Although these difficulties are apparent and have characterized these types of installations for many years, a satisfactory solution has heretofore escaped the art.

The effectiveness, efficiency and advantages of the large volume separate tank and pool are sharply curtailed by the single throttling passageway or conduit therebetween. By constricting the passage of fluids between the two tanks to a pipe of relatively narrow cross-sectional area, as is the practice, the advantageous aspects of high volume units are substantially neutralized. Relatively small amounts of solid sludge, which carry over into the connecting pipe between the two tanks, are sufficient to block further flow therethrough, to cripple the action of both tanks, and, in severe cases, cause backflow into the residence or other building unit to which the tanks are connected.

It is, therefore, an object of this invention to provide a single composite or combination structure for both septicizing and leaching sewage.

A further object of this invention is to provide a septicizing and leaching structure requiring but a single excavation for installation and use.

Another object of the invention is the provision of a leaching structure which may be used in conventional manner or in conjunction with a septic tank made in accordance with this invention and installed within said leaching structure in the manner herein described.

Still another object of this invention is the provision of separate septicizing and leaching structures which may individually be made of reinforced, pre-cast concrete and which may then be assembled on location to form a composite septicizing and leaching structure.

A further object of this invention is the provision of a septic tank which may be installed within and used with a conventional leaching structure.

An important feature of the present invention is the fact that, although it combines a septic tank with a leaching structure, these two units may easily be disassembled for cleaning purposes. Since the two units are combined in use and occupy but a single excavation, it will be readily appreciated that only a single opening is required to reach these units for cleaning and other purposes.

The invention is illustrated in the accompanying drawing, in which:

FIGURE 4 is a vertical section therethrough on the line 4—4 of FIGURE 3.

FIGURE 5 is a transverse vertical section on the line 5—5 of FIGURE 3.

FIGURE 6 is a horizontal section through the composite unit, said section being taken on the line 6—6 of FIGURE 1.

FIGURE 7 is an exploded perspective view of a modified form of the invention.

Figure 1:
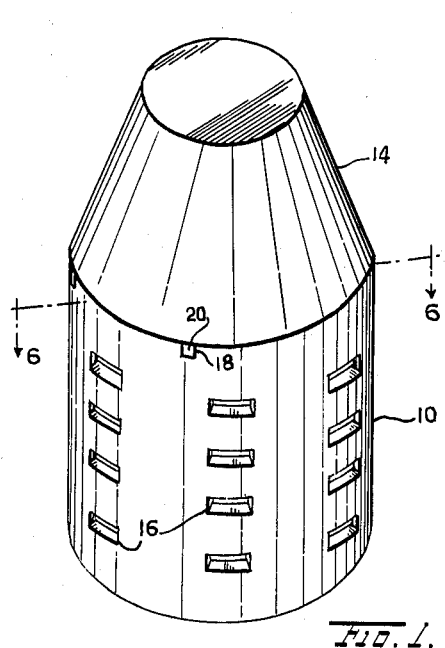
FIGURE 1 is a perspective view of a combined septic tank and leaching pool incorporating the features of this invention.
Figure 2:
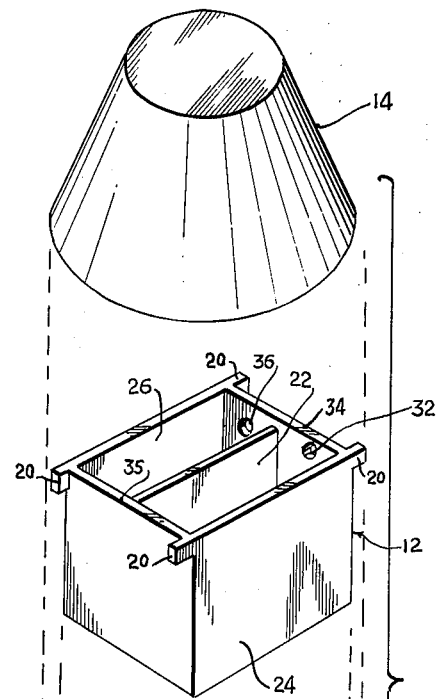
FIGURE 2 is an exploded perspective view of the three component parts thereof, one being the leaching structure, the second being the septic tank, and the third a cover for both the leaching structure and the septic tank.

Referring now to the embodiment of this invention which is illustrated in FIGURES 1 to 6 of the drawing, it will be observed that this embodiment comprises a leaching structure 10, a septic tank 12, and a top cover 14 for said leaching structure and septic tank. In this form of the invention the leaching structure 10 is a reinforced, pre-cast concrete hollow cylinder having a plurality of openings 16 formed therein. As is conventional, these openings are tapered from relatively small inner proportions along the inside wall of the structure to relatively large outer proportions at the outer wall of the structure. They may be tapered and inclined to facilitate casting and to help insure an outward, as distinguished from an inward, flow. The number of such openings and their shape and relative dimensions are matters of design.

It will now be understood that the cylindrical leaching structure 10 is open both at the top and bottom. Its dimensions are such as to enable it to accommodate the septic tank 12, which, in this preferred form of the invention, is a rectangular box. This is best seen in FIGURE 6. Formed in the top edge of cylindrical structure 10 are two pairs of notches 18 which are adapted to receive the four corner lugs 20 on the septic tank 12. The relative dimensions of said leaching structure 10 and septic tank 12 are such as to permit the former to receive the latter, while at the same time lugs 20 enter and engage notches 18. See FIGURE 6, where the corners of the septic tank are shown to be located in close proximity to the inner wall of the cylindrical leaching structure.

Cover 14 is simply a truncated cone, its larger diameter being at the bottom and its smaller diameter at the top. It is open at the bottom but closed at the top in order to protect the leaching and septicizing structures below it.

Close inspection of FIGURE 1 will disclose the fact that when lugs 20 of the septic tank 12 occupy their respective notches 18 in the leaching structure 10, a relatively smooth and continuous circular edge is formed at the upper end of the leaching structure. This renders it possible to utlize a conical cover 14 having a relatively smooth continuous peripheral edge at its lower end. The cover will thereby be very adequately seated and supported on the leaching structure. It will, of course, be understood that the invention is not limited to a conical cover, and any other conventional shape may be used for this purpose.

Figure 3:
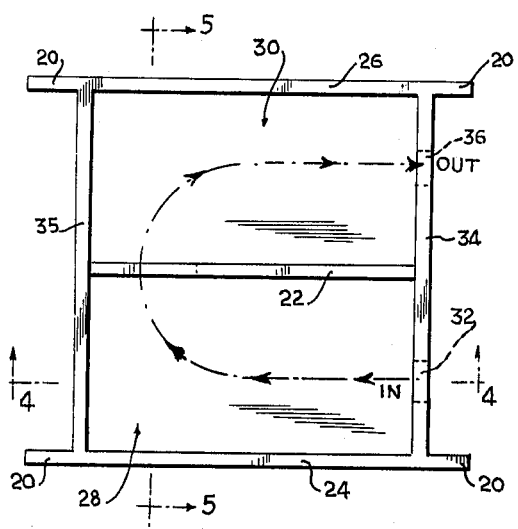
FIGURE 3 is a top view of the septic tank.

Rectangular septic tank 12 has an inner vertical baffle wall or partition 22 extending longitudinally thereof, approximately midway between its two side walls 24 and 26, respectively. FIGURES 3 and 6 will disclose the fact that lugs 20 are continuous with and extensions of said side walls. Two chambers or compartments 28 and 30 are thereby formed within the septic tank, on opposite sides of the baffle wall or partition 22. An inlet port or opening 32 is formed in one end wall 34 of the septic tank for communication with chamber 28, and an outlet port or opening 36 is formed in the same end wall for communication with chamber 30. It will be observed in FIGURE 5 that the inlet opening 32 is situated at a somewhat higher level than the outlet opening 36. It will further be noted in FIGURE 5, as well as in FIGURE 4, that an opening 38 is provided in the baffle wall or partition 22, a spaced distance above the bottom wall 42, to provide communication between the two inner chambers 28 and 30. Openings 32 and 36 are generally circular, while opening 38 is generally rectangular. This is a matter of design and convenience. It will be understood that opening 32 is connected in conventional manner to a sewage pipe or other conduit passing through a registering opening 33 in the wall of leaching structure 10, connected to the sanitary facilities of a residence or other building. Sewage enters compartment 28 through inlet port 32 and the solids 40 thereof tend to settle on the bottom wall 42 of the septic tank. Relatively clear liquid material 44 remains on top of the solids and flows through opening 38 in the baffle wall or partition 32. The second compartment 30 is thereby filled with the liquid material, and to some extent a settling process occurs in said compartment as well. Solids which remain suspended in the liquid in the first compartment tend to settle out in the second, and what remains is a fairly clear liquid which tends to flow out of the septic tank through outlet port 36.

The formation of sludge is constantly opposed by anaerobic bacterial action in the first chamber or compartment 28, and the sludge is continuously decomposed into fluid material. This is a conventional procedure in septic tank operations and forms no part of the present invention except that it is used in conjunction therewith. In short, the septicizing action in septic tank 12 is intended to be entirely conventional.

Since the septic tank defines a generally rectangular box, its side walls 24 and 26 being parallel to each other, and its end walls 34 and 35 being parallel to each other, it will be understood that spaces 50, 52, 54 and 56 are formed between said side and end walls of the septic tank, on the one hand, and the inner cylindrical wall of the leaching structure, on the other hand. Since in the preferred form of this invention the cylindrical leaching structure is substantially deeper than the septic tank, an additional space will be formed between the bottom wall of said septic tank and the lower end of said leaching structure. All of these spaces between the walls of the septic tank and the inner wall and lower end of the leaching structure are in open and free communication with each other. When the liquid material 44 rises sufficiently in the septic tank to pass out of said tank through opening 36, it will flow into space 54 between end wall 34 of the septic tank and the inner cylindrical wall of the leaching structure. Since this space is in communication with all of the other spaces last mentioned between the septic tank and the leaching structure, the liquid will tend to occupy all such spaces to the extent that it cannot readily escape through the openings in the leaching structure into the ambient soil outside.

Turning now to FIGURE 7 of the drawing, it will be seen that leaching structure 10A corresponds to leaching structure 10 above described, septic tank 12A corresponds to septic tank 12, and cover 14A corresponds to cover 14. The only essential difference resides in the fact that notches 18 are absent from leaching structure 10A, while corresponding notches 18A are formed in the lower edge of cover 14A. Leaching structure 10A is intended to represent a conventional structure of this type, and, as is the case with said conventional structures, its upper peripheral edge is relatively smooth and continuous. When septic tank 12A is installed within the leaching structure 10A, lugs 20A of said septic tank simply rest upon the upper peripheral edge of the leaching structure. To accommodate these lugs notches 18A are formed along the lower peripheral edge of the conical cover 14A. Consequently, when the cover is installed on the combined septic tank and leaching structure shown in FIGURE 7, said cover is firmly and securely situated on the upper peripheral edge of said leaching structure.

FIGURE 7 illustrates how a septic tank as herein described and claimed may be installed within a conventional leaching structure in order to form the combined septicizing and leaching unit which the present invention provides. In all respects other than the notch arrangement last above described the septicizing and leaching structure of FIGURE 7 corresponds to the septicizing and leaching structure of FIGURES 1 to 6, structurally, functionally, and in all other essential respects.

The foregoing is illustrative of preferred forms of this invention. These forms may be modified in design, in dimensions, materials and many other respects, without departing from the essential principles of the invention and the scope of the claims.

What is claimed is:

1. A septicizing and leaching assembly of the character described, comprising a generally cylindrical leaching structure having a plurality of openings formed in its side wall, said cylindrical leaching structure being open at the top, a generally rectangular septic tank mounted within said leaching structure, means supporting the upper end of said septic tank on the upper end of said leaching structure, the corners of said rectangular septic tank abutting the cylindrical leaching structure, the outer walls of the septic tank and the inner wall of the leaching structure forming communicating spaces between said outer and inner walls, a baffle wall being provided in said septic tank, dividing and separating it into two compartments, an opening formed in said baffle wall a spaced distance above the bottom wall of said septic tank to provide communication between said compartments, an inlet opening formed in one of the side walls of the septic tank to permit a flow of material into one of said compartments, an outlet opening formed in one of the side walls of the septic tank to permit a flow of material out of the second compartment and into the communicating spaces between said septic tank and said leaching structure, and a generally conical cover mounted on the upper end of said leaching structure, and covering both the septic tank and the leaching structure.

2. A septicizing and leaching assembly in accordance with claim 1, wherein the generally cylindrical leaching structure, the generally rectangular septic tank and the generally conical cover constitute separate and separable precast concrete units.

References Cited by the Examiner

UNITED STATES PATENTS

| | | | |
|---|---|---|---|
| 337,584 | 3/1886 | Jackson | 210—476 |
| 1,408,810 | 3/1922 | Lawrence. | |
| 1,470,745 | 10/1923 | Johnson | 210—320 |
| 1,574,603 | 2/1926 | Burtis | 210—170 |
| 1,889,485 | 11/1932 | Martin | 210—476 X |
| 2,482,870 | 9/1949 | Price | 210—542 |
| 2,796,176 | 6/1957 | Monson | 210—261 |
| 3,057,796 | 10/1962 | Davis | 210—532 X |
| 3,097,166 | 7/1963 | Monson | 210—261 X |

FOREIGN PATENTS 886,674    7/1943    France.

REUBEN FRIEDMAN, *Primary Examiner.*

HERBERT L. MARTIN, *Examiner.*